(12) United States Patent
Gruidl et al.

(10) Patent No.: US 11,135,687 B2
(45) Date of Patent: Oct. 5, 2021

(54) METHOD FOR PRODUCING A REFRIGERATOR AND/OR FREEZER APPLIANCE

(71) Applicant: LIEBHERR-HAUSGERÄTE LIENZ GMBH, Lienz (AT)

(72) Inventors: Thomas Gruidl, Oberdrauburg (AT); Andreas Winkler, Irschen (AT); Markus Köfele, Hopfgarten (AT)

(73) Assignee: LIEBHERR-HAUSGERÄTE LIENZ GMBH, Lienz (AT)

(*) Notice: Subject to any disclaimer, the term of this patent is extended or adjusted under 35 U.S.C. 154(b) by 0 days.

(21) Appl. No.: 16/475,459

(22) PCT Filed: Jan. 23, 2018

(86) PCT No.: PCT/EP2018/051592
§ 371 (c)(1),
(2) Date: Jul. 2, 2019

(87) PCT Pub. No.: WO2018/134440
PCT Pub. Date: Jul. 26, 2018

(65) Prior Publication Data
US 2020/0030923 A1 Jan. 30, 2020

(30) Foreign Application Priority Data
Jan. 23, 2017 (DE) .................. 10 2017 000 568.0
Jun. 30, 2017 (DE) .................. 10 2017 114 659.8

(51) Int. Cl.
*B23P 15/26* (2006.01)
*F25D 23/06* (2006.01)

(52) U.S. Cl.
CPC ............ *B23P 15/26* (2013.01); *F25D 23/066* (2013.01)

(58) Field of Classification Search
CPC .... B23P 15/26; F25D 23/066; F25D 2201/14; F25D 23/062; Y02B 40/00
See application file for complete search history.

(56) References Cited

U.S. PATENT DOCUMENTS

| 2,385,627 | A | * | 9/1945 | Jones | ..................... B21B 9/00 72/46 |
| 3,960,631 | A | | 6/1976 | Weiss et al. | |

(Continued)

FOREIGN PATENT DOCUMENTS

| CN | 103104046 A | 5/2013 |
| DE | 69211679 T2 | 11/1996 |

(Continued)

OTHER PUBLICATIONS

German Patent Application No. 102017114659.8, Search Report, dated May 29, 2018.

(Continued)

*Primary Examiner* — Lawrence Averick
(74) *Attorney, Agent, or Firm* — Marshall, Gerstein & Borun LLP

(57) ABSTRACT

The present invention relates to a method of manufacturing a refrigerator unit and/or freezer unit having a refrigerated inner space and having an outer unit wall, wherein at least one vacuum insulation body is arranged between the refrigerated inner space and the outer unit wall to minimize the heat input from outside into the refrigerated inner space, wherein the vacuum insulation body and/or the contact region of the unit to which it is to be connected is/are provided with a hot melt adhesive; the vacuum insulation body is moved into the desired position relative to the contact region and is applied there; and the hot melt adhesive is then activated by the effect of heat.

15 Claims, 2 Drawing Sheets

(56) References Cited

U.S. PATENT DOCUMENTS

Figure 1:
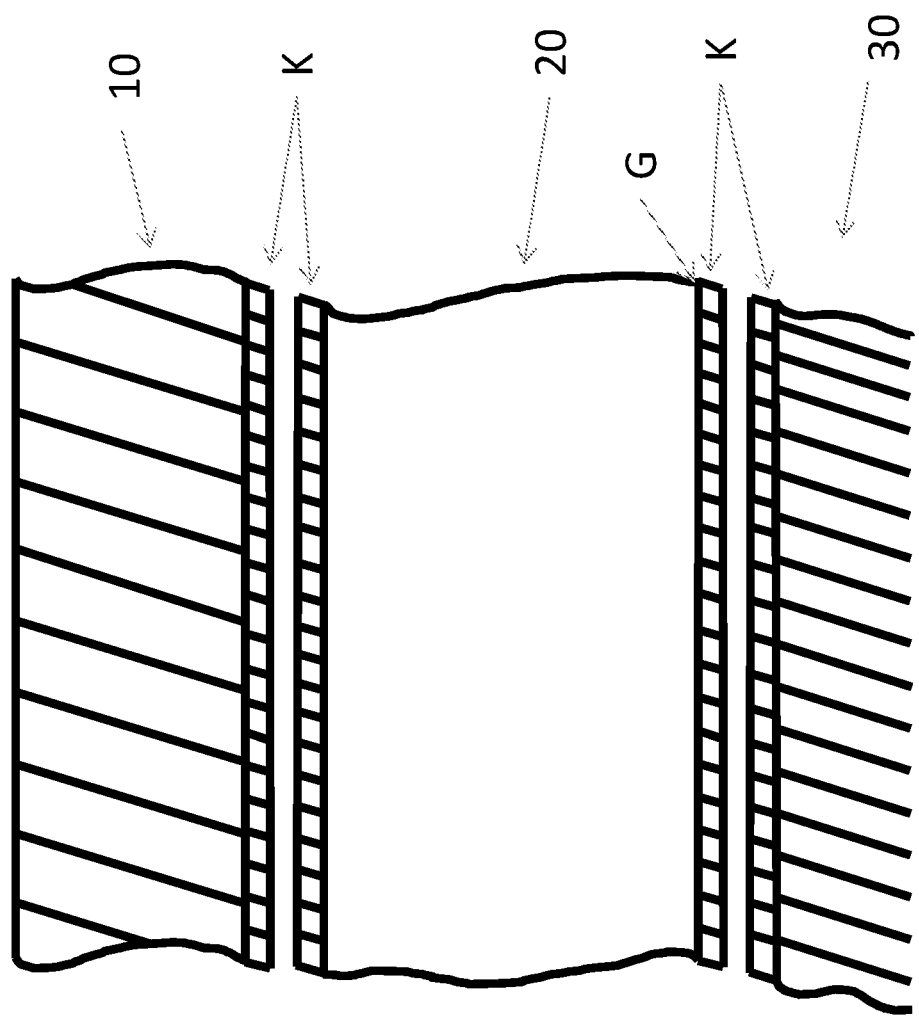

| | | | |
|---|---|---|---|
| 4,033,484 A * | 7/1977 | Ornsteen | B05C 17/00533 |
| | | | 222/146.5 |
| 5,834,126 A | 11/1998 | Sheu | |
| 6,860,082 B1 * | 3/2005 | Yamamoto | B62D 33/048 |
| | | | 52/794.1 |
| 2009/0179541 A1 | 7/2009 | Smith et al. | |
| 2013/0257257 A1 | 10/2013 | Cur et al. | |

FOREIGN PATENT DOCUMENTS

| | | |
|---|---|---|
| DE | 69502510 T2 | 9/1998 |
| DE | 60036572 T2 | 10/2008 |
| DE | 102009002800 A1 | 11/2010 |
| DE | 102010029583 A1 | 12/2011 |
| JP | S608688 A | 1/1985 |
| JP | H04160298 A | 6/1992 |
| JP | H09133289 A | 5/1997 |
| JP | 2007-211913 A | 8/2007 |
| JP | 2010-242875 A | 10/2010 |

OTHER PUBLICATIONS

Habenicht, Kleben: Grundlagen, Technologien, Andwendungen. 5., erweiterte under aktualisierte Ausgabe. S.104, S.206-215, S.566-578, Berlin Heidelberg New York: Springer (2006).
International Application No. PCT/EP2018/051592, International Search Report, dated Mar. 27, 2018.
International Application No. PCT/EP2018/051592, Written Opinion, dated Mar. 27, 2018.

* cited by examiner

METHOD FOR PRODUCING A REFRIGERATOR AND/OR FREEZER APPLIANCE

The present invention relates to a method of manufacturing a refrigerator unit and/or freezer unit having a refrigerated inner space and having an outer unit wall, wherein at least one vacuum insulation body is arranged between the refrigerated inner space and the outer unit wall to minimize the heat input from outside into the refrigerated inner space.

Refrigerator units and/or freezer units are known from the prior art in which one or more vacuum insulation bodies are located between the outer wall of the unit and the inner container that bounds the refrigerated inner space. They have the task of keeping a heat input into the refrigerated inner space as small as possible.

Such vacuum insulation bodies are known, for example, as vacuum panels or also as full vacuum insulation bodies. Vacuum panels are typically foamed into place so that the resistance against the transmission of heat is achieved by the foaming, on the one hand, and by the vacuum panel, on the other hand. In the case of a full vacuum insulation body, there is typically no further heat insulation material between the outer wall and the inner container except for the full vacuum insulation body. The full vacuum insulation body, for example, comprises a high barrier film in which a core material such as perlite is present. A vacuum is present in the interior of the region surrounded by the high barrier film.

A high barrier film is preferably understood as a sheath or a film by means of which the gas input into the vacuum insulation body is reduced so much that the increase in the thermal conductivity of the vacuum insulation body due to gas input is sufficiently low over its service life. A time period of 15 years, preferably of 20 years, and particularly preferably of 30 years is, for example, to be set as the service life. The increase in the thermal conductivity of the vacuum insulation body caused by gas input is preferably <100% and particularly preferably <50% over its service life. The area-specific gas transmission rate of the high barrier film is preferably $<10^{-5}$ mbar*l/s*m$^2$ and particularly preferably $<10^{-6}$ mbar*l/s*m$^2$ (measured as per ASTM D-3985). This gas transmission rate applies to nitrogen and to oxygen. Low gas transmission rates are likewise present for other kinds of gas (in particular water vapor), preferably in the range of $<10^{-2}$ mbar*l/s*m$^2$ and particularly preferably in the range of $<10^{-3}$ mbar*l/s*m$^2$ (measured as per ASTM F-1249-90). The aforesaid small increases of the thermal conductivity are preferably achieved by these small gas transmission rates.

High barrier films are preferably understood within the framework of the present invention as single layer or multilayer films (that are preferably sealable) having one or more barrier layers (typically metallic layers or oxide layers, with aluminum or an alumina preferably being used as the metal or oxide) that satisfy the above-named demands (increase in thermal conductivity and/or area-specific gas transmission rate) as a barrier against the gas input.

The above-named values or the structure of the high barrier film is/are exemplary, preferred indications that do not restrict the invention.

The attachment of the vacuum insulation body mostly takes place at the inner or outer top layer, i.e. at the inner container or at the outer wall (or at their coatings) of the unit by an adhesive connection. This is often carried out manually, more rarely in an automated manner.

The adhesive in known embodiments is applied, i.e. metered and distributed, directly before the establishing of the adhesive connection as a liquid to pasty adhesive by spraying, pouring, or rolling onto one or both adhesive partners.

It is the underlying object of the present invention to further develop a method of the initially named kind such that the manufacture of the unit is more efficient than is the case with known units.

This object is satisfied by a method having the features of claim 1.

Provision is accordingly made that the vacuum insulation body and/or the contact region of the unit to which it is to be connected (subsequently called "the adhesive partners") is/are provided with a hot melt adhesive, that the vacuum insulation body is moved into the desired position relative to the contact region and is applied there, and that the hot melt adhesive is then activated by the effect of heat, i.e. it unfolds its adhesive effect.

The contact region is preferably configured as a contact surface.

It is thus the underlying idea of the present invention to implement the adhesive connection by heat activation of a hot melt adhesive already present on one or both of the adhesive partners. The hot melt adhesive is thus already present on the adhesive partner or partners. It can be present as a coating, for example. The hot melt adhesive is not only applied directly before the assembly of the vacuum insulation body, but is rather already present on this or on the adhesive partner long before the installation.

In accordance with the invention, there is thus a time offset between the application of the adhesive layer and its activation.

The application of the adhesive preferably takes place simultaneously with or directly after the manufacture of the adhesive partner or partners.

The application of the hot melt adhesive preferably already takes place in the semifinished stage, whereby it can take place substantially more efficiently than at the finished refrigeration unit element or freezer unit element. A substantial cost advantage thereby results.

The adhesive partner or partners can be stored or manipulated as long as desired in the "cold state", i.e. with a non-activated hot melt adhesive, without thereby substantially influencing the quality of the later connection, which brings about a logistics advantage.

One or both adhesive partners are thus preferably provided with the non-activated, i.e. still cold, hot melt adhesive before the installation process of the vacuum insulation body starts.

The hot melt adhesive can, for example, be a thermoplastic material or a heat-actuable reactive adhesive.

The use of a thermoplastic adhesive such as polyethylene and/or polypropylene is conceivable, for example.

Provision can furthermore be made that the contact region is formed by the inner side of the outer unit wall or outer door wall and/or by the outer side of an inner container or of the inner door wall. The contact region at which the vacuum insulation body is adhesively bonded can thus be the inner side of the outer unit wall or the inner side of the outer wall of the closure element, in particular of the door, by means of which the refrigerated inner space can be closed.

It is also conceivable that the contact region is the outer side of the inner container that bounds the refrigerated inner space and/or is the side of the inner wall of the closure element, in particular of the door, remote from the refrigerated inner space.

It is conceivable that the contact region is a metal sheet or its coating and that the hot melt adhesive is carried out directly subsequent to a coil coating process. The hot melt adhesive can thus be applied, for example, as a thermoplastic film or as a thermally actuable reactive adhesive.

A coil coating process is to be understood as a process in which a metal strip coating of flat steel strips or aluminum strips takes place continuously (at one or both sides). A composite material of a metallic carrier material and an organic coating is produced in this process.

It is also conceivable that the contact region is a plastic surface or its coating and that a thermoplastic film is coextruded as a hot melt adhesive with the plastic surface or with the coating or that a colamination of a thermoplastic sheet as the film takes place directly in or subsequent to the extrusion process of the plastic surface.

The coextruded material can be thermoformed in the further processing.

In a preferred embodiment, the method is carried out such that the following layer structure is obtained from the outside to the inside: Metal sheet/PE/gas barrier/perlite/gas barrier/PE/HIPS, wherein PE stands for polyethylene and HIPS stands for high impact polystyrene.

It is conceivable that the vacuum insulation body has a barrier film that serves the maintenance of the vacuum in the vacuum insulation body and that the hot melt adhesive is applied by coextrusion in the manufacture of the barrier film or as a colaminate.

It is conceivable in an embodiment that the barrier film is at least partially formed by the contact surface. Due to the compact connection, that is preferably gas impermeable, that arises, the adhesive partners can, in addition to their other functions as a wall, etc., simultaneously autonomously act as one or more barrier layers that have the task of maintaining the vacuum in the vacuum insulation body for as long as possible. The required individual components in the unit construction can thus be reduced. A combined structure as a film and as a steel sheet can thus be present, for example, with both forming the barrier layer of the vacuum insulation body.

The activation of the hot melt adhesive by heat input preferably takes place through the contact surface. If one of the adhesive partners is, for example, the outer wall of the unit, the heat input can take place through this wall.

The heat input preferably takes place from "outside" by a contact of the wall element with a heated tool or with another heat source.

The activation of the hot melt adhesive by heat input takes place after the final positioning of the adhesive partners relative to one another.

It is conceivable that the activation of the hot melt adhesive takes place by heat input from a tool that is heated.

It can serve both as a heat transfer agent to start the activation process and for a possibly required cooling of the established adhesive connection that is possibly required to achieve the required mechanical strength for a further processing of the unit or of the assembly.

The tool preferably additionally takes over the fixing of the parts to be adhered to one another and optionally the pressing of the adhesive partners with one another during the adhesive process.

The tool can be configured both as a mechanically stable tool or as an elastic film through which the heat is transmitted. If it is designed as a mechanically stable tool, it can, for example, be implemented by a frame that e.g. comprises metal and that has temperature control passages or electrical heating elements.

The tool can also be a stabilizing frame and a film, preferably an elastic film, e.g. of silicone, that is spanned within this frame and that can be drawn over complex geometries, also of varying sizes.

In this case the energy input or the heat input can take place e.g. by means of an IR radiator.

Alternatively or in addition to a direct transmission from the heated tool, the heat introduction into the hot melt adhesive can take place via radiation, inductively, or by ultrasound (ultrasound welding).

The required contact pressure on the adhesive partners and optionally on their undercuts can be achieved, for example, in that a vacuum is generated beneath the film so that the latter is pressed onto the adhesive partners or exerts a pressing force thereon. Reduced tool costs result through this embodiment.

It is pointed out at this point that the terms "a" or "one" do not necessarily refer to exactly one of the elements in question even though this is also a possible embodiment of the invention. The terms can thus also indicate a plurality of the elements in question.

As stated, the film can be pressed onto the parts to be adhered by application of a vacuum.

The present invention further relates to a refrigerator unit and/or freezer unit that is manufactured in accordance with the disclosed examples.

A possible layer structure for the unit wall is, from the outside to the inside, the sequence metal sheet/PE/gas barrier/perlite/gas barrier/PE/HIPS. The gas barrier is preferably a high barrier film having the initially named properties.

The present invention further relates to a vacuum insulation body for use in a refrigerator unit and/or freezer unit in accordance with the disclosed examples, with the vacuum insulation body being provided with hot melt adhesive.

Further details and advantages of the invention will be explained in more detail with reference to an embodiment described in the following and shown in the drawing.

The Figures show an exemplary layer structure of a refrigerator unit and/or freezer unit manufactured in accordance with the invention.

The embodiment relates to a refrigerator whose refrigerated inner space is bounded by the inner container and by the inner wall of the door.

The refrigerated inner space is located in a unit carcass whose side walls and the upper wall comprise sheet metal. This applies accordingly to the outer side of the door.

One or more vacuum insulation bodies are located in the space between the outer side of the inner container and the inner side of the outer sheet metal wall. One or more vacuum insulation bodies can also be located between the inner wall and the outer wall of the door.

These vacuum insulation bodies have an outer sheath composed of a high barrier film and a powdery core material, e.g. composed of perlite. There is a vacuum in the region bounded by the high barrier film.

A layer that forms the hot melt adhesive to be activated by heat is coextruded with the manufacture of the high barrier film. A lamination or colamination is also conceivable instead of a coextrusion.

The hot melt adhesive does not exert any adhesive effect in the non-activated state, i.e. without the effect of heat, so that the handling of the vacuum insulation bodies can take place without limitations.

To assemble the vacuum insulation body between the inner side and the outer side of the door and/or between the inner container and the outer wall of the carcass, it is moved by means of a tool precisely to the position at which it should be located in the completed unit. The vacuum insulation body is then pressed onto the contact surface, e.g. onto the inner side of the outer wall of the carcass, by means of the tool and a heat input subsequently follows so that the hot melt adhesive is activated, i.e. develops its adhesive properties.

The tool maintains the pressing force during the adhesive process or during the hardening of the adhesive. After a specific period of time, when the adhesive is activated, the heating device of the tool is switched off.

The tool then supports the cooling process of the adhesive connection. If it is sufficiently completely hardened, the tool is removed.

FIG. 1 shows in a sectional representation the unit wall before the joining together of the layers of the hot melt adhesive.

Reference numeral 10 marks the inner container of the unit of plastic (thickness 1200 μm); reference numeral K marks respective layers of hot melt adhesive each having of thickness of 50 μm. A vacuum insulation body is marked by reference numeral 20 (thickness 500 μm) and a gas barrier, preferably in the form of a film (thickness 10 μm) by reference numeral G. Reference numeral 30 represents the outer unit wall of sheet metal (thickness 500 μm).

Figure 2:
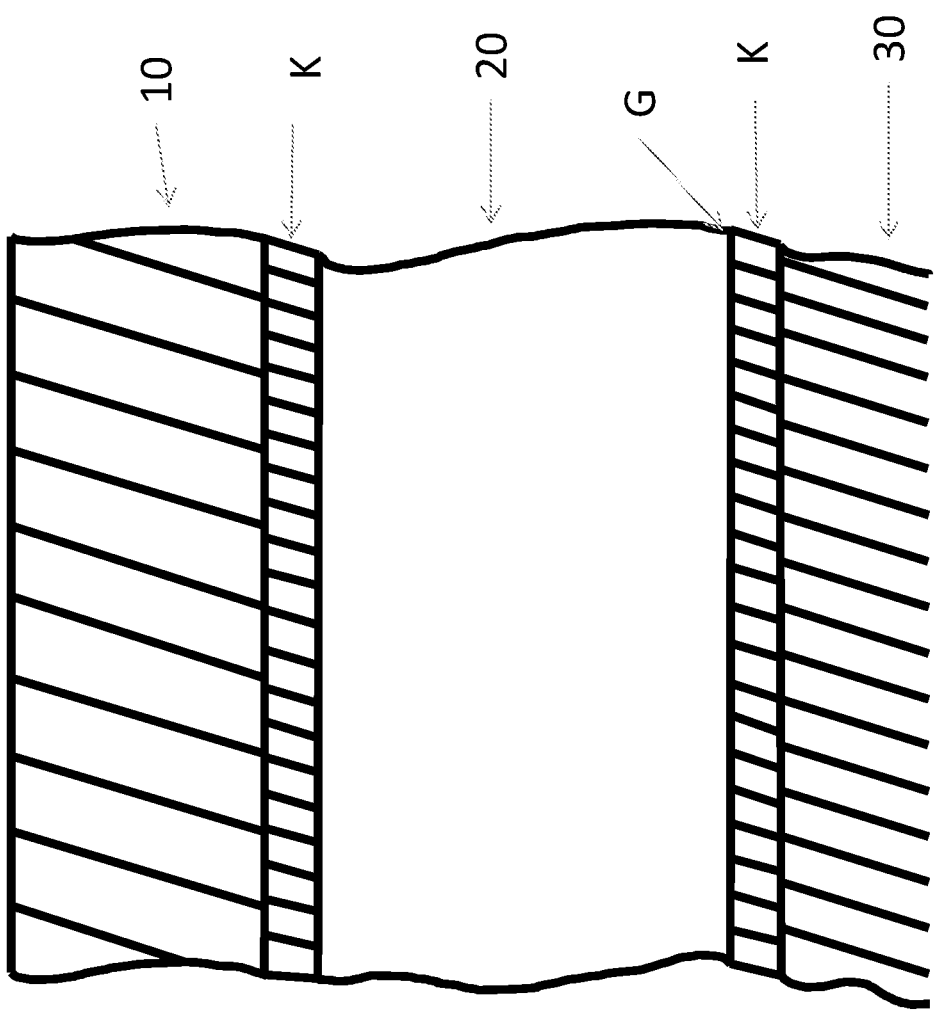

The parts shown in FIG. 1 are joined together, as is shown in FIG. 2, in which the same reference numerals are used for the same components as in FIG. 1. The adhesive layers K are not joined together so that only one adhesive layer K is produced between the inner container and the vacuum insulation and between the vacuum insulation or the gas barrier and the sheet metal or steel that forms the outer wall of the carcass or of the closure element, etc., said one adhesive layer K having double the thickness of the individual adhesive layers K, i.e. here 100 μm.

A pressing together subsequently takes place and the hot melt adhesive is activated, for example by a suitable tool having a heating device. This tool or a different tool maintains the pressing force during the hardening. Once the adhesive is hardened, the heating device is deactivated.

It must finally be noted that the thicknesses specified with reference to FIGS. 1 and 2 represent exemplary values that do not restrict the invention.

The invention claimed is:

1. A method of manufacturing a refrigerator unit and/or freezer unit having a refrigerated inner space and having an outer unit wall,
   wherein at least one vacuum insulation body is arranged between the refrigerated inner space and the outer unit wall to minimize the heat input from outside into the refrigerated inner space,
   wherein the vacuum insulation body and/or a contact region of the unit to which it is to be connected is/are provided with a hot melt adhesive;
   in that the vacuum insulation body is moved into a desired position relative to the contact region and is applied there; and
   in that the hot melt adhesive is then activated by the effect of heat, wherein the heat introduction takes place via radiation, inductive heat, or by ultrasound.

2. A method in accordance with claim 1, wherein the hot melt adhesive is a thermoplastic material or a heat-actuable adhesive.

3. A method in accordance with claim 1, wherein the contact region is formed by an inner side of the outer unit wall or an outer door wall and/or by an outer side of an inner container or of an inner door wall.

4. A method in accordance with claim 1, wherein the contact region is a metal sheet; and the hot melt adhesive is applied subsequent to a coil coating process.

5. A method in accordance with claim 1, wherein the contact region is a plastic surface; and a thermoplastic film is coextruded with the plastic surface as a hot melt adhesive; or a colamination of a thermoplastic film as a sheet takes place directly in or subsequent to the extrusion process of the plastic surface.

6. A method in accordance with claim 5, wherein the coextruded material is thermoformed in the further processing.

7. A method in accordance with claim 1, wherein the vacuum insulation body has a gas barrier that serves to maintain the vacuum in the vacuum insulation body; and the hot melt adhesive is applied by coextrusion on the manufacture of the gas barrier or as a colaminate.

8. A method in accordance with claim 7, wherein the gas barrier is at least partly formed by the contact region.

9. A method in accordance with claim 1, wherein the activation of the hot melt adhesive takes place by heat input through the contact region.

10. A method in accordance with claim 1, wherein the activation of the hot melt adhesive takes place by heat input from a tool.

11. A method in accordance with claim 10, wherein the cooling of the adhesive connection and/or the fixing of parts to be adhesively bonded to one another likewise take(s) place by means of the tool.

12. A method in accordance with claim 11, wherein the tool is formed as a mechanically stable tool or as an elastic sheet through which the heat is transmitted.

13. A method in accordance with claim 12, wherein the sheet is pressed on to the parts to be adhesively bonded by applying a vacuum.

14. A method in accordance with claim 10, wherein the tool is formed as a mechanically stable tool or as an elastic sheet through which the heat is transmitted.

15. A method in accordance with claim 14, wherein the sheet is pressed on to the parts to be adhesively bonded by applying a vacuum.

* * * * *